(12) United States Patent
Lindlbauer et al.

(10) Patent No.: US 9,026,292 B2
(45) Date of Patent: May 5, 2015

(54) FUEL TANK ISOLATION VALVE CONTROL

(71) Applicant: Ford Global Technologies, LLC, Dearborn, MI (US)

(72) Inventors: Michael Paul Lindlbauer, Canton, MI (US); Ted Haladyna, Northville, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 13/948,668

(22) Filed: Jul. 23, 2013

(65) Prior Publication Data

US 2015/0032307 A1    Jan. 29, 2015

(51) Int. Cl.
*B60L 9/00* (2006.01)
*B60K 15/035* (2006.01)
*F02M 25/08* (2006.01)

(52) U.S. Cl.
CPC ............ *B60K 15/035* (2013.01); *Y10S 903/903* (2013.01); *F02M 25/0836* (2013.01); *F02M 25/08* (2013.01); *B60K 15/03504* (2013.01)

(58) Field of Classification Search
CPC .............. F02M 25/08; F02M 25/0836; F16K 31/0655; B60K 15/03519; B60K 15/03504
USPC .......... 701/22, 86, 103; 903/903; 180/65.285
See application file for complete search history.

(56) References Cited

U.S. PATENT DOCUMENTS

| | | | |
|---|---|---|---|
| 4,962,744 A | 10/1990 | Uranishi et al. | |
| 6,964,193 B2 | 11/2005 | Kobayashi et al. | |
| 7,004,013 B2 | 2/2006 | Kobayashi et al. | |
| 7,233,845 B2 | 6/2007 | Veinotte | |
| 7,472,583 B2 | 1/2009 | Kato et al. | |
| 7,562,559 B2 * | 7/2009 | Chung et al. .................... | 73/49.7 |
| 8,245,699 B2 | 8/2012 | Peters et al. | |
| 8,342,157 B2 | 1/2013 | Der Manuelian et al. | |
| 8,434,461 B2 * | 5/2013 | Kerns et al. .................... | 123/521 |
| 8,551,214 B2 * | 10/2013 | Dudar et al. ....................... | 95/19 |
| 2005/0044935 A1 | 3/2005 | Barrera et al. | |
| 2011/0265768 A1 | 11/2011 | Kerns et al. | |
| 2012/0211087 A1 | 8/2012 | Dudar et al. | |
| 2012/0215399 A1 | 8/2012 | Jentz et al. | |

FOREIGN PATENT DOCUMENTS

DE   102011116320 A1   4/2012
JP   H07317612 A       12/1995

OTHER PUBLICATIONS

Jentz, Robert Roy et al., "Engine-Off Refueling Detection Method," U.S. Appl. No. 13/788,624, filed Mar. 7, 2013, 32 pages.
Yang, Dennis Seung-Man et al., "Refueling Detection for Diagnostic Monitor," U.S. Appl. No. 13/875,201, filed May 1, 2013, 31 pages.
Dudar, Aed M. et al., "Internal Orifice Characterization in Leak Check Module," U.S. Appl. No. 13/891,054, filed May 9, 2013, 37 pages.
Dudar, Aed M. et al., "Fuel Tank Depressurization Before Refueling a Plug-In Hybrid Vehicle," U.S. Appl. No. 13/906,187, filed May 30, 2013, 28 pages.

* cited by examiner

*Primary Examiner* — Gertrude Arthur Jeanglaud
(74) *Attorney, Agent, or Firm* — David Kelley; Alleman Hall McCoy Russell & Tuttle LLP (57) ABSTRACT

Methods and systems for controlling a fuel tank isolation valve coupled to a fuel tank in a vehicle are disclosed. In one example approach, a method comprises, in response to a refuel request, actuating a fuel tank isolation valve to vent a fuel tank for refueling; and, in response to a pressure in the fuel tank below a threshold pressure after a predetermined time duration, discontinuing actuation of the fuel tank isolation valve to seal the fuel tank.

20 Claims, 4 Drawing Sheets

FUEL TANK ISOLATION VALVE CONTROL

BACKGROUND/SUMMARY

Fuel tanks in vehicles may be vented during refueling, wherein fuel is replenished in the fuel tank, in order to reduce pressure in the tank during refueling. For example, a canister vent valve may be opened to put the fuel tank in communication with the atmosphere in response to a refuel request, e.g., a vehicle operator input to initiate refueling or a refueling door opening. In some applications, a fuel tank isolation valve may be coupled to a fuel tank to control fuel tank venting. For example, a fuel tank isolation valve may be located in a conduit between a fuel tank and a fuel vapor canister in an evaporative emission control system and actuated during certain conditions to vent the fuel tank.

In some applications, e.g., in a hybrid electric vehicle (HEV) or a plug-in hybrid electric vehicle (PHEV), a sealed fuel system with a normally closed fuel tank isolation valve may be used to reduce evaporative emissions. In such applications, the fuel tank isolation valve may be actuated and held open during a refuel event to reduce fuel tank pressure build up. For example, such pressure increases during refueling may lead to fuel pump nozzle shut-offs. The inventors herein have recognized that powering a fuel tank isolation valve for any length of time when not necessary consumes power that reduces fuel economy of PHEV and HEV vehicles. For example, powering the valve continuously during a refueling event when the vehicle operator is not adding fuel to the fuel tank or is adding fuel to the fuel tank slowly may unnecessarily consume power leading to fuel economy reduction.

In order to address these issues, in one example approach a method for a vehicle with an engine comprises, in response to a refuel request, actuating a fuel tank isolation valve to vent a fuel tank for refueling; and, in response to a pressure in the fuel tank below a threshold pressure after a predetermined time duration, discontinuing actuation of the fuel tank isolation valve to seal the fuel tank.

In this way, a fuel tank isolation valve may be closed after a calibratable time period if the tank pressure is low to save power since low fuel tank pressure may indicate that fuel is either not flowing into the tank or is flowing in at a low rate from a fuel pump nozzle. The fuel tank isolation valve may then be re-opened/energized if/when pressure is seen to increase (due either to fuel flow from a nozzle or due to evaporation of the fuel) and may stay open until a time out occurs or if the fuel door is closed indicating an end of refueling event. Such an approach may result in a reduction of power consumption in the vehicle and an increased fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
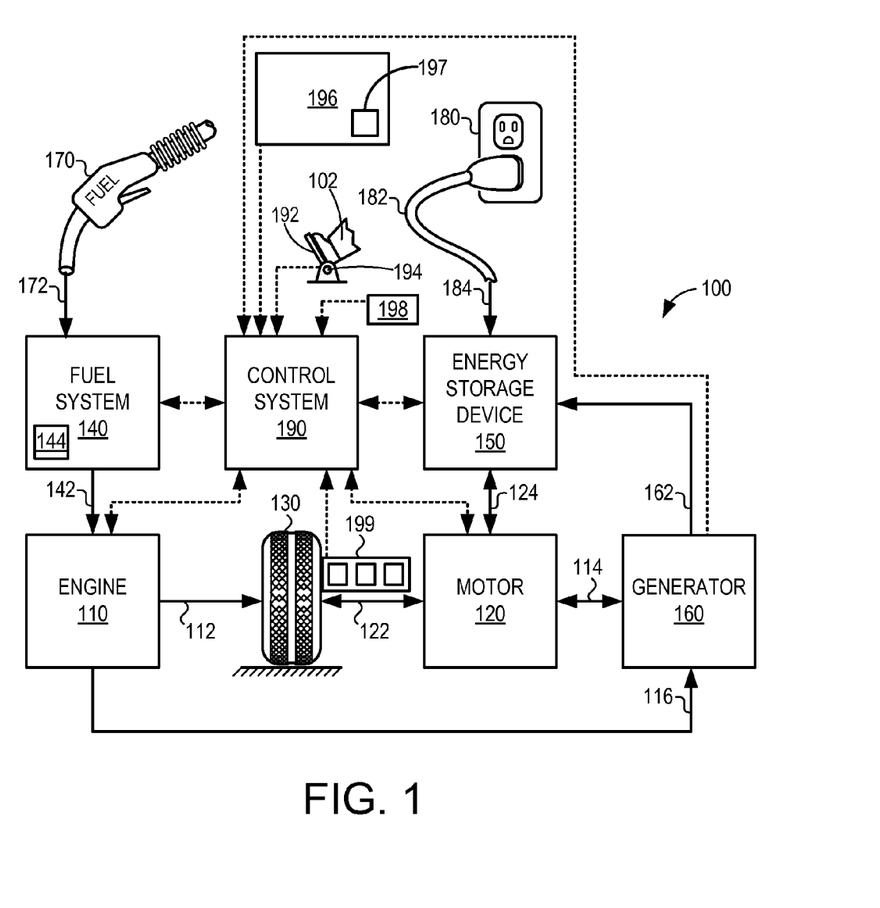
FIG. 1 shows an example vehicle propulsion system.
Figure 3:
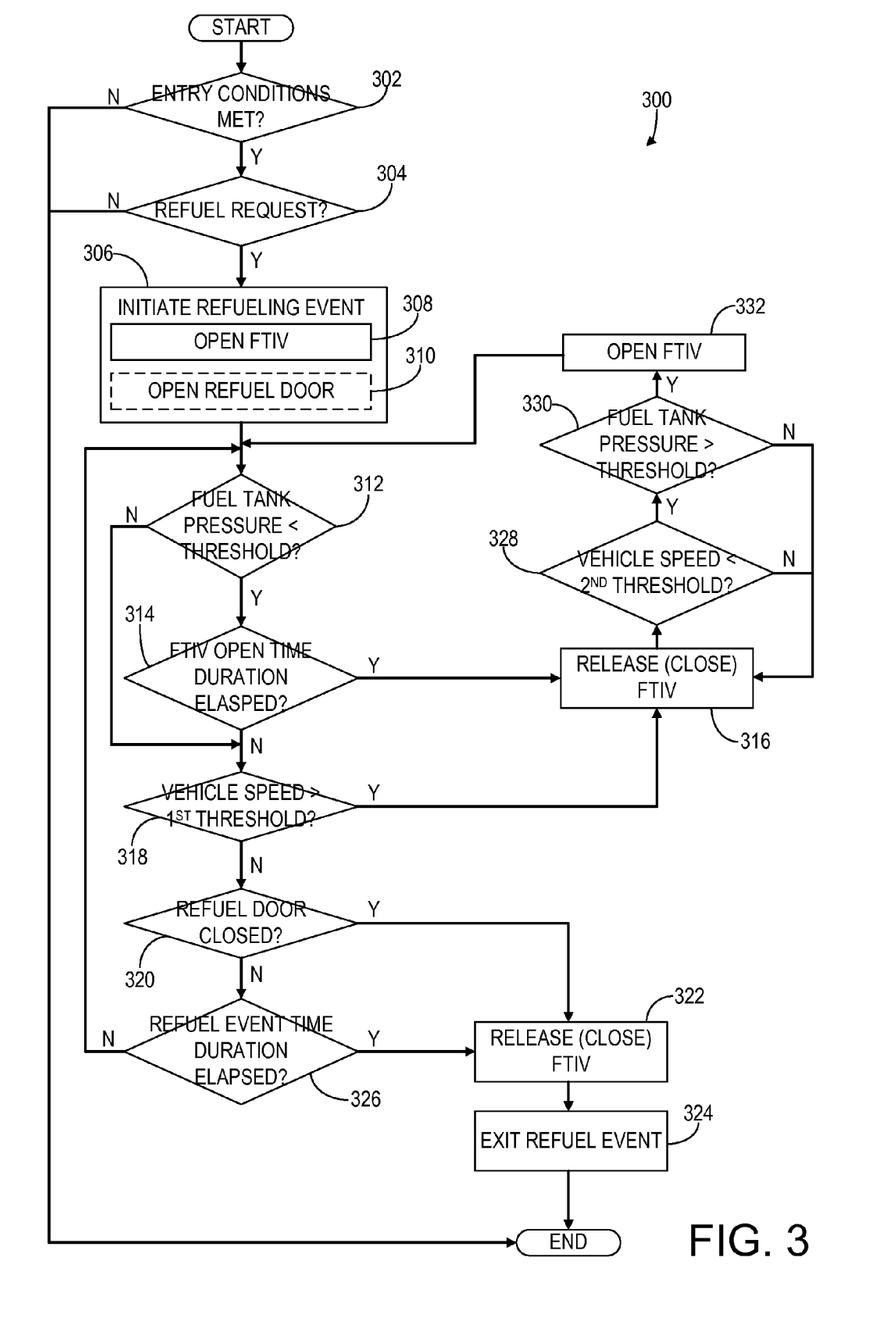
FIG. 3 shows an example method for controlling a fuel tank isolation valve during a refueling event in accordance with the disclosure.
Figure 4:
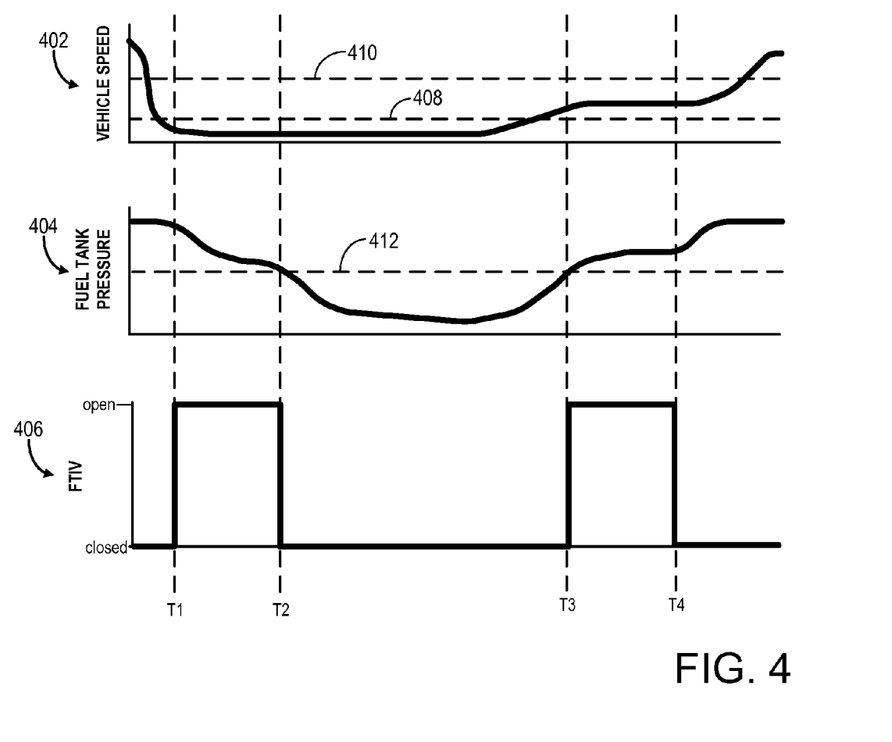
FIG. 4 illustrates an example method for controlling a fuel tank isolation valve during a refueling event in accordance with the disclosure.

The following description relates to systems and methods for controlling a fuel tank isolation valve (FTIV) in a vehicle, such as the hybrid electric vehicle (HEV) shown in FIG. 1. During a refueling event, a fuel tank of an engine, such as the example engine shown in FIG. 2, may be vented to the atmosphere by actuating a fuel tank isolation valve so that pressure in the fuel tank is reduced during refueling. As remarked above, in hybrid electric applications, the fuel tank isolation valve may be a normally closed valve so that the fuel system is maintained sealed except during refueling events in order to reduce evaporative emissions. In such applications, the fuel tank isolation valve may be actuated and held open during a refuel event to reduce fuel tank pressure build up. In order to reduce power consumption, as shown in FIGS. 3 and 4, the fuel tank isolation valve may be released or closed during a refueling event in response to certain conditions, e.g., if fuel is not being added to the fuel tank or if a rate of fuel added to the fuel tank is less than a threshold since, during these conditions, venting of the fuel tank may not be needed. For example, a fuel tank isolation valve may be closed after a calibratable time period if the tank pressure is low to save power since low fuel tank pressure may indicate that fuel is either not flowing into the tank or is flowing in at a low rate from a fuel pump nozzle. The fuel tank isolation valve may then be re-opened/energized if/when pressure is seen to increase (due either to fuel flow from a nozzle or due to evaporation of the fuel) and may stay open until a time out occurs or if a refuel door is closed indicating an end of refueling event.

Turning now to the figures, FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 3, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling switch or button 197 which may be manually actuated or pressed by a vehicle operator to initiate refueling. For example, as described in more detail below, in response to the vehicle operator actuating refueling button 197, a fuel tank in the vehicle may be depressurized via actuation of a fuel tank isolation valve so that refueling may be performed. Further, the vehicle instrument panel may provide indications to a vehicle operator in response to an initiation of a refueling event and/or in response to a termination of a refueling event, e.g., via a display and/or via audio signals.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Figure 2:
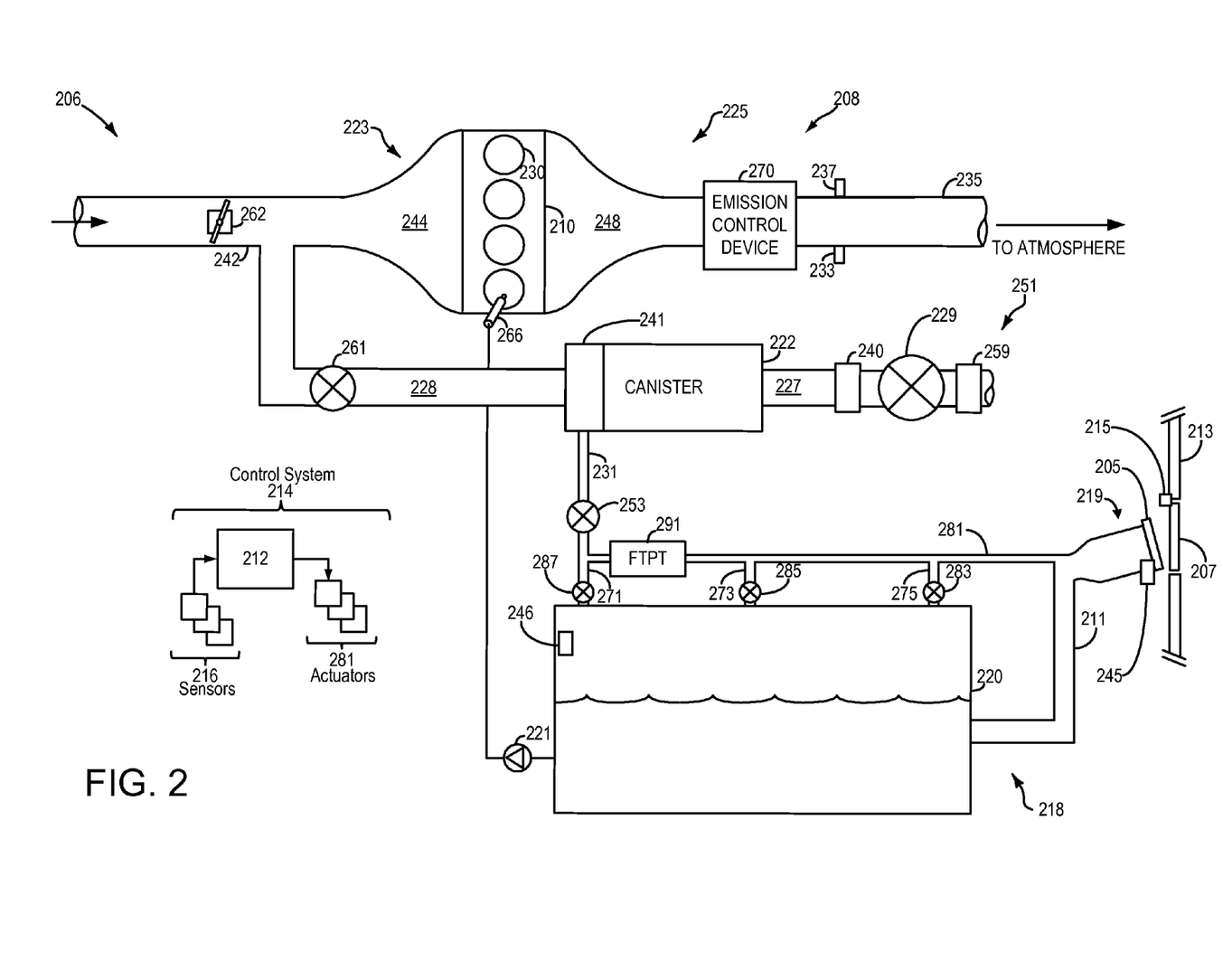
FIG. 2 shows an example vehicle system with a fuel system.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid vehicle system as described above with regard to FIG. 1. However, in other examples, vehicle system 206 may not be a hybrid vehicle system and may be propelled via the engine system 208 only.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may include a temperature sensor 246 disposed therein.

Vapors generated in fuel system 218 may be routed to an evaporative emissions control system 251 which includes a fuel vapor canister 222 via vapor recovery line 231, before being purged to the engine intake 223. Fuel vapor canister 222 may include a buffer or load port 241 to which fuel vapor recovery line 231 is coupled.

Vapor recovery line 231 may be coupled to fuel tank 220 via one or more conduits and may include one or more valves for isolating the fuel tank during certain conditions. For example, vapor recovery line 231 may be coupled to fuel tank 220 via one or more of a combination of conduits 271, 273, and 275. Further, in some examples, one or more fuel tank isolation valves may be included in recovery line 231 or in conduits 271, 273, or 275. Among other functions, fuel tank isolation valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283, and/or conduit 231 may include an isolation valve 253. Fuel tank isolation valve 253 is located in conduit 231 between fuel vapor canister 222 and fuel tank 220. Further, in some examples, recovery line 231 may be coupled to a fuel filler system 219.

In some examples, fuel filler system may include a fuel cap 205 for sealing off the fuel filler system from the atmosphere. Refueling system 219 is coupled to fuel tank 220 via a fuel filler pipe or neck 211. Further, a fuel cap locking mechanism 245 may be coupled to fuel cap 205. The fuel cap locking mechanism may be configured to automatically lock the fuel cap in a closed position so that the fuel cap cannot be opened. For example, the fuel cap 205 may remain locked via locking mechanism 245 while pressure or vacuum in the fuel tank is greater than a threshold. In response to an identification of a refueling event, the fuel tank may be depressurized, e.g., via actuation of fuel tank isolation valve 253, and the fuel cap unlocked after the pressure or vacuum in the fuel tank falls below a threshold. Further, a refuel door 207 may be included in a side 213 of the vehicle. A refuel door sensor 215 may be coupled to refuel door 207 and configured to detect a position of refuel door 207. For example, sensor 215 may be configured to detect when refuel door 207 is open or closed. In some examples, an actuator may be coupled to refuel door 207 and may be configured to open the refuel door in response to an initiation of a refueling event and close the refuel door in response to a termination of a refueling event.

A fuel tank pressure transducer (FTPT) 291, or fuel tank pressure sensor, may be included between the fuel tank 220 and fuel vapor canister 222, to provide an estimate of a fuel tank pressure. As described below, sensor 291 may be used to monitor changes in pressure and/or vacuum in the fuel system to determine if conditions are met for discontinuing actuation of a fuel tank isolation valve during a refueling event. The fuel tank pressure transducer may alternately be located in vapor recovery line 231, purge line 228, vent line 227, or other location within emission control system 251. As another example, one or more fuel tank pressure sensors may be located within fuel tank 220.

Emissions control system 251 may include one or more emissions control devices, such as one or more fuel vapor canisters, e.g., fuel vapor canister 222, filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve may be a normally open valve so that one or more fuel tank isolation valves, e.g., valves 87, 285, 283 or 253 may be used to control venting of fuel tank 220 with the atmosphere. For example, in hybrid vehicle applications, a fuel tank isolation valve may be a normally closed valve so that by opening the isolation valve, fuel tank 220 may be vented to the atmosphere and by closing the isolation valve, fuel tank 220 may be sealed from the atmosphere. In some examples, a fuel tank isolation valve may be actuated by a solenoid so that, in response to a current supplied to the solenoid, the valve will open. For example, in hybrid vehicle applications, the fuel tank 220 may be sealed off from the atmosphere in order to contain diurnal vapors inside the tank since the engine run time is not guaranteed. Thus, for example, a fuel tank isolation valve may be a normally closed valve which is opened in response to certain conditions. For example, a fuel tank isolation valve may be commanded open following a detection of a refueling event so that the fuel tank is depressurized for refueling.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, canister temperature sensor 243, refuel door sensor 215, and fuel tank temperature sensor 246. Other sensors such as pressure, temperature, air/fuel ratio, and composition sensors may be coupled to various locations in the vehicle system 206. As another example, the actuators may include fuel injector 266, throttle 262, valves 253, 287, 285, 283, and pump 240. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 3.

FIG. 3 shows an example method 300 for controlling a fuel tank isolation valve to reduce power consumption associated with maintaining the isolation valve in an open position during a refueling event. Method 300 may be used to selectively deactivate a fuel tank isolation valve, e.g., fuel tank isolation valve 253, in a conduit between a fuel vapor canister, e.g., canister 222, and a fuel tank, e.g., fuel tank 220, based on pressure in the fuel tank, e.g., a measured by pressure sensor 291, and other refueling conditions.

At 302, method 300 includes determining if entry conditions are met. Determining if entry conditions are met may include determining if the vehicle is stationary or not, e.g., entry conditions may include conditions when the vehicle not in motion. In some examples, entry conditions may include an engine-off or key-off event; however, method 300 may also be performed during engine-on or key-on conditions in some examples. If entry conditions are met at 302, method 300 proceeds to 304. At 304, method 300 includes determining if a refuel request occurs. For example, a refuel request may include an actuation of a switch or button by a vehicle operator. As another example, a refuel request may include a detection of an open refuel door, e.g., via a sensor 215 coupled to refuel door 207. As still another example, a refuel request may include an opening a fuel cap, e.g., fuel cap 205, or any other suitable indication that a refueling event is initiated. If a refuel request occurs at 304, method 300 proceeds to 306.

At 306, method 300 includes initiating a refueling event. Initiating a refueling event may include opening the fuel tank isolation valve at 308. For example, fuel tank isolation valve 253 may be a normally-closed valve which is actuated (energized) to an open position in response to the refuel request in order to vent the fuel tank for refueling. Actuation of the fuel tank isolation may include supplying a current to an actuator, e.g., a solenoid, coupled to the isolation valve, so that the valve is maintained in an open position by a continuous supply or current or power.

In some examples, initiating the refueling event may further include opening a refuel door at 310. For example, refuel door 207 may be opened or unlocked. As another example, initiating the refueling event may further include unlocking a fuel cap, e.g., fuel cap 205 may be unlocked so that a fuel nozzle may be inserted therein. As still another example, initiating the refueling event may further include providing an indication to a vehicle operator, e.g., via a display in the vehicle, that a refueling event has been initiated. For example, a light may be illuminated in an instrumental panel in the vehicle indicating that a refueling event is initiated.

At 312, method 300 includes determining if fuel tank pressure is less than a threshold. Following initiation of the refueling event which includes venting the fuel tank via actuation of the fuel tank isolation valve, an initial pressure decrease in the fuel tank may occur due to the venting. However, if the pressure continues to decrease below a threshold following initiation of the refueling event, then this pressure decrease may indicate that fuel is not being added to the fuel tank or that a rate of fuel added to the fuel tank is less than a threshold. During such conditions, venting of the fuel tank may not be necessary so that, as described below, actuation of the fuel tank isolation valve to vent the fuel tank may be discontinued in order to conserve power. If fuel tank pressure is not less than the threshold at 312, method 300 proceeds to 318 described below. However, if fuel tank pressure is less than the threshold at 312, method 300 proceeds to 314.

At 314, method 300 includes determining if a fuel tank isolation valve (FTIV) time duration has elapsed. The fuel tank isolation valve time duration may be a predetermined, calibratable time duration such that if pressure in the fuel tank remains below a threshold for the predetermined time duration, then the actuation of the fuel tank isolation valve to vent the fuel tank may be discontinued in order to conserve power. As described above, pressure in the fuel tank below a threshold may indicate that substantially no fuel is being added to the fuel tank. If such a condition persists for the predetermined time duration, then the isolation valve may be closed to discontinue venting the fuel tank.

Thus, if the FTIV time duration has elapsed at 314, method 300 proceeds to 316 to release (close) the FTIV so that, in response to a pressure in the fuel tank below a threshold pressure after a predetermined time duration, actuation of the fuel tank isolation valve to seal the fuel tank is discontinued in order to reduce power consumption associated with maintaining the isolation valve energized and open during the refueling event.

Thus, at 316 the fuel tank isolation valve may be closed even if a refueling of the fuel tank is still in progress or not completed or even if fuel is being provided by a vehicle operator to the fuel tank via a fuel nozzle. For example, even though the refuel door may be detected as open, if the pressure decreases below the threshold for a predetermined time duration, the fuel tank isolation valve may be closed while the refuel door remains open. As another example, while fuel is provided to the fuel tank via a fuel nozzle (or while an indication of such is being provided or generated), if the pressure decreases below the threshold for a predetermined time duration, the fuel tank isolation valve may be deactivated to a closed position before the refueling is complete or while fuel is still being provided to the fuel tank with the fuel tank isolation valve in the closed position.

However, if the FTIV time duration has not elapsed at 314, then method 300 proceeds to 318. At 318, method 300 includes determining if a vehicle speed is greater than a first threshold. The first threshold may be vehicle speed such that below the first threshold refueling may take place but above the first threshold refueling may not take place. For example, refueling may not occur if the vehicle is in motion, so vehicle speed above a threshold (to avoid issues with the vehicle stationary but rocking a bit back and forth) may be used as a condition to indicate a refuel event is not to be allowed (if a refuel button is pushed with the vehicle in motion) or ended (vehicle started moving after refueling is complete but the door sensor indicated the refuel door is still open). Thus, at 318, method 300 may include determining whether or not the vehicle is in motion. If the vehicle is in motion then this may indicate that fuel is not be added to the fuel tank so that the fuel tank isolation valve may be closed to save power at 316. In some examples, refueling may be performed during very low vehicle speeds so that if the vehicle speed is not greater than the first threshold, method 300 may proceed to 320.

At 320, method 300 includes determining if a refuel door is closed. For example, sensor 215 coupled to refuel door 207 may be used to determine whether or not the refuel door is closed or it may be determined if a fuel cap 205 is replaced or closed to determine whether or not the refuel event has been terminated. For example, if the refuel door is closed at 320, then method 300 may proceed to 322 to release or deactivate the fuel tank isolation valve so that venting of the fuel tank is discontinued. At 324, method 300 may then include exiting the refuel event. Exiting the refueling event may include locking a fuel cap, closing a fuel door, and/or indicating a termination of the refueling event to a vehicle operator, via a display in the vehicle, for example.

However, if a refuel door is not closed at 320, method 300 proceeds to 326. At 326, method 300 includes determining if a refuel event time duration has elapsed. For example, a refuel event time duration may be a predetermined time duration such that a refueling event is automatically terminated after the refuel event time duration has elapsed. If a refuel event time duration has elapsed at 326, method 300 proceeds to 322 to close the FTIV and exit the refuel event at 324.

However, if a refuel event time duration has not elapsed at 326, method 300 proceed back to 312 to continue monitoring pressure in the fuel tank to determine if the fuel tank isolation valve can be deactivated to save power. As remarked above, during some conditions, after the fuel tank isolation valve has been closed during the refueling event, e.g., in response to pressure in the fuel tank below a threshold for a predetermined time duration, during certain conditions the fuel tank isolation valve may be reenergized to open the isolation valve to vent the tank for refueling.

For example, if a pressure in the fuel tank begins to increase after the fuel tank isolation valve has been closed during the refueling event, then this may indicate that fuel is again being added to the fuel tank or that a rate of fuel added to the fuel tank is above a threshold during which the fuel tank should again be vented. Thus, returning to 316, after the fuel tank isolation valve is closed during the refuel event, method 300 proceeds to 328 determining if a vehicle speed is less than a second threshold. For example, the second threshold may be a vehicle speed threshold above which refueling cannot take place and below which refueling can take place. For example, at 328 method 300 may include determine whether the vehicle is in motion. If the vehicle is in motion of if the vehicle speed is not less than the second threshold at 328, then method 300 may continue back to 316 to continuing deactivation of the fuel tank isolation valve to save power. However, if vehicle speed is less than the second threshold at 328, e.g., if the vehicle is not in motion, then method 300 proceeds to 330.

At 330, method 300 includes determining if fuel tank pressure is greater than a threshold. While the fuel tank isolation valve is closed during the refueling event, if pressure in the canister increases above a threshold then, as remarked above, this may indicate that fuel is being added to the fuel tank. If fuel tank pressure is not greater than the threshold at 330, method continues the release of the fuel tank isolation valve to the closed position at 316. However, if fuel tank pressure is greater than the threshold at 330, method 300 proceeds to 332 to again actuate the fuel tank isolation valve to an open position. For example, after discontinuing actuation of the fuel tank isolation valve to seal the fuel tank, the fuel tank isolation valve may be again actuated to vent the fuel tank in response to a pressure in the fuel tank above the threshold pressure. After reopening the fuel tank isolation valve at 332, method 300 may return to 312 to monitor pressure in the fuel tank to determine if the fuel tank isolation valve can be deactivated to save power. Each of the above operations may be performed during engine-off conditions.

FIG. 4 illustrates an example method, e.g., method 300 described above, for controlling a fuel tank isolation valve during a refueling event based on pressure in the fuel tank and other refueling conditions. The graph 402 in FIG. 4 shows vehicle speed versus time. Graph 404 shows fuel tank pressure, e.g., as measured by pressure sensor 291, versus time. Graph 406 shows actuation of a fuel tank isolation valve (FTIV), e.g., valve 253, versus time.

At time T1, in FIG. 4, a refuel request occurs. For example, the refuel request may occur during engine-off conditions. In some examples, the engine-off conditions may occur during vehicle-on conditions, e.g. when the vehicle is moving at a speed as indicated in graph 402. However, in other examples, the engine-off conditions may occur during vehicle-off conditions, e.g., following a key-off event or other vehicle-off initiation event. As remarked above, the refuel request may occur in response to a vehicle operator input, e.g., a refuel button being pressed or a fuel door or fuel cap being opened.

In response to the refuel request at time T1, the fuel tank isolation valve is activated or energized to vent the fuel tank leading to an initial decrease in pressure in the fuel tank. At time T2, pressure in the fuel tank decreases below a threshold pressure 412 indicating that fuel is not being added to the fuel tank or that a rate of fuel added to the fuel tank is below a threshold. During these conditions, the fuel tank may no longer need to be vented to the atmosphere so that, at time T2, activation of the fuel tank isolation valve is discontinued so that the valve closes while the vehicle speed is less than a first threshold 408, e.g., if the vehicle is not in motion.

At time T3 during the refueling event, pressure in the fuel tank increases above threshold 412 indicating that fuel is being added to the fuel tank or that a rate of fuel added to the fuel tank increases above a threshold. During these conditions, it may be desirable to again provide venting to the fuel tank. Thus at time T3, the fuel tank isolation valve is again actuated or energized to an open position to vent the tank while fuel is replenished in the tank. In some examples, during these conditions, the vehicle may be moving with a speed less than a second threshold speed 410 greater than the first threshold speed 408. However, in other examples, the vehicle may not be moving and second threshold 410 may be substantially the same as first threshold 408, where the first threshold 408 and the second threshold 410 are substantially zero.

At time T4, the refueling event is terminated, e.g., in response to a vehicle operator input requesting termination of the refuel event or in response to a refueling event time duration elapsing. Thus, at T4, activation of the fuel tank isolation valve is discontinued so that the fuel tank is no longer vented following the refueling event.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle with an engine, comprising:
receiving a refuel request;
in response to the refuel request, actuating a fuel tank isolation valve via a controller to vent a fuel tank for refueling;
detecting a fuel tank pressure; and
in response to the fuel tank pressure being below a threshold pressure after a predetermined time duration, discontinuing actuation of the fuel tank isolation valve to seal the fuel tank.

2. The method of claim 1, wherein the refuel request comprises one or more of an actuation of a switch by a vehicle operator and a detection of an open refuel door.

3. The method of claim 1, wherein discontinuing actuation of the fuel tank isolation valve to seal the fuel tank is performed while fuel is being added to the fuel tank.

4. The method of claim 1, further comprising discontinuing actuation of the fuel tank isolation valve to seal the fuel tank in response to detection of a refuel door closed.

5. The method of claim 1, further comprising discontinuing actuation of the fuel tank isolation valve to seal the fuel tank in response to a vehicle speed greater than a speed threshold.

6. The method of claim 1, further comprising, after discontinuing actuation of the fuel tank isolation valve to seal the fuel tank, actuating the fuel tank isolation valve to vent the fuel tank in response to a pressure in the fuel tank above the threshold pressure.

7. The method of claim 1, further comprising, after discontinuing actuation of the fuel tank isolation valve to seal the fuel tank, actuating the fuel tank isolation valve to vent the fuel tank in response to an increase in pressure in the fuel tank.

8. The method of claim 1, further comprising, after discontinuing actuation of the fuel tank isolation valve to seal the fuel tank, actuating the fuel tank isolation valve to vent the fuel tank in response to an increase in pressure in the fuel tank and then discontinuing actuation of the fuel tank isolation valve to seal the fuel tank in response to detection of a refuel door closed.

9. The method of claim 1, further comprising, after discontinuing actuation of the fuel tank isolation valve to seal the fuel tank, actuating the fuel tank isolation valve to vent the fuel tank in response to an increase in pressure in the fuel tank and then discontinuing actuation of the fuel tank isolation valve to seal the fuel tank after a predetermined refuel time duration.

10. The method of claim 1, further comprising, after discontinuing actuation of the fuel tank isolation valve to seal the fuel tank, actuating the fuel tank isolation valve to vent the fuel tank in response to an increase in pressure in the fuel tank and then discontinuing actuation of the fuel tank isolation valve to seal the fuel tank in response to a vehicle speed greater than a threshold.

11. The method of claim 1, wherein the vehicle is a hybrid electric vehicle.

12. A method for a vehicle, comprising:
during an engine-off condition:
receiving a refuel request;
opening a fuel tank isolation valve via a controller to vent a fuel tank for refueling in response to the refuel request;
detecting a fuel tank pressure; and
in response to the fuel tank pressure decreasing below a threshold pressure after a predetermined time duration, closing the fuel tank isolation valve to seal the fuel tank.

13. The method of claim 12, wherein the refuel request comprises one or more of an actuation of a switch by a vehicle operator and a detection of an open refuel door.

14. The method of claim 12, wherein closing the fuel tank isolation valve to seal the fuel tank is performed before the refueling is complete.

15. The method of claim 12, further comprising closing the fuel tank isolation valve to seal the fuel tank in response to detection of a refuel door closed.

16. The method of claim 12, further comprising closing the fuel tank isolation valve to seal the fuel tank in response to a vehicle speed greater than a speed threshold, wherein the vehicle is a hybrid electric vehicle.

17. The method of claim 12, further comprising, after closing the fuel tank isolation valve to seal the fuel tank, opening the fuel tank isolation valve to vent the fuel tank in response to an increase in pressure in the fuel tank.

18. A method for a hybrid electric vehicle, comprising:
receiving a refuel request;
in response to the refuel request, actuating a fuel tank isolation valve to vent a fuel tank via a controller for refueling;
detecting a pressure in the fuel tank;
in response to the pressure in the fuel tank below a threshold pressure after a predetermined time duration, discontinuing actuation of the fuel tank isolation valve to seal the fuel tank before the refueling is complete; and
after discontinuing actuation of the fuel tank isolation valve to seal the fuel tank, actuating the fuel tank isolation valve to vent the fuel tank in response to an increase in pressure in the fuel tank.

19. The method of claim 18, further comprising discontinuing actuation of the fuel tank isolation valve to seal the fuel tank in response to detection of a refuel door closed.

20. The method of claim 18, further comprising discontinuing actuation of the fuel tank isolation valve to seal the fuel tank in response to a vehicle speed greater than a speed threshold.

* * * * *